(12) United States Patent
Gao et al.

(10) Patent No.: US 10,498,273 B2
(45) Date of Patent: Dec. 3, 2019

(54) EXTERNALLY MODULATED INDEPENDENT SPEED VARIABLE FREQUENCY GENERATOR

(71) Applicant: The Boeing Company, Chicago, IL (US)

(72) Inventors: Lijun Gao, Renton, WA (US); Eugene Solodovnik, Kenmore, WA (US); Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/959,507

(22) Filed: Apr. 23, 2018

(65) Prior Publication Data
US 2019/0326839 A1 Oct. 24, 2019

(51) Int. Cl.
*H02P 9/00* (2006.01)
*H02P 9/42* (2006.01)
*H02P 9/08* (2006.01)
*F02N 11/04* (2006.01)

(52) U.S. Cl.
CPC ............... *H02P 9/42* (2013.01); *F02N 11/04* (2013.01); *H02P 9/08* (2013.01)

(58) Field of Classification Search
CPC .. H02P 9/007; H02P 9/302; H02P 9/42; H02P 9/08; H02K 1/272; H02K 19/26
USPC ............................................. 322/44, 28, 89
See application file for complete search history.

(56) References Cited

U.S. PATENT DOCUMENTS

| 4,044,285 A | * | 8/1977 | Plunkett | H02P 21/10 318/803 |
| 4,625,160 A | * | 11/1986 | Hucker | H02K 3/16 310/115 |
| 4,772,802 A | * | 9/1988 | Glennon | F02N 11/04 290/31 |

(Continued)

FOREIGN PATENT DOCUMENTS

| EP | 1826890 | 8/2007 |
| GB | 975102 | 11/1964 |

OTHER PUBLICATIONS

Gao, Lijun and Liu, Shengyi; U.S. Appl. No. 15/819,919, filed Nov. 21, 2017; "Independent Speed Variable Frequency Alternating Current Generator."

(Continued)

*Primary Examiner* — Julio C. Gonzalez
(74) *Attorney, Agent, or Firm* — Parsons Behle & Latimer

(57) ABSTRACT

Described is an independent speed variable frequency generator system that may include a rotor and a stator. The system may further include a pilot generator stage including a magnetic field source positioned on the rotor and a set of pilot multiphase windings positioned on the stator. The system may also include a high frequency transformer stage including a first set of high frequency transformer multiphase windings positioned on the stator and a second set of high frequency transformer multiphase windings positioned on the rotor. The system may also include a main machine stage including a set of main field multiphase windings positioned on the rotor and a set of main armature multiphase windings positioned on the stator, where the second set of high frequency transformer multiphase windings are coupled directly to the set of main field multiphase windings. The system may include a generator control unit.

20 Claims, 5 Drawing Sheets

(56) References Cited

U.S. PATENT DOCUMENTS

| | | | | |
|---|---|---|---|---|
| 4,868,406 | A | * | 9/1989 | Glennon .................. F02N 11/04 290/4 R |
| 5,097,195 | A | * | 3/1992 | Raad ....................... F02N 11/04 290/38 R |
| 8,593,095 | B2 | * | 11/2013 | Markunas ................. H02P 6/20 318/400.33 |
| 10,113,525 | B2 | * | 10/2018 | Dal ......................... H02P 21/34 |
| 2004/0080300 | A1 | * | 4/2004 | Xu .......................... F02C 7/268 322/59 |
| 2006/0087293 | A1 | * | 4/2006 | Xu .......................... H02K 19/26 322/59 |
| 2007/0222220 | A1 | * | 9/2007 | Huang .................... F02N 11/04 290/31 |
| 2012/0211981 | A1 | * | 8/2012 | De Wergifosse ....... F02C 7/275 290/31 |
| 2016/0130970 | A1 | * | 5/2016 | Blazer .................... H02K 19/38 290/7 |
| 2016/0365814 | A1 | | 12/2016 | Gieras |

OTHER PUBLICATIONS

Liu, Shengyi and Gao, Lijun; U.S. Appl. No. 15/872,383, filed Jan. 16, 2018; "System and Method for Operating an Independent Speed Variable Frequency Generator as a Starter."

Liu, Shengyi and Gao, Lijun; U.S. Appl. No. 15/866,064, filed Jan. 9, 2018; Independent Speed Variable Frequency Based Electrified Propulsion System Architecture.

European Patent Office; Extended European Search Report; European Patent Application No. 19170257; dated Sep. 10, 2019.

* cited by examiner

EXTERNALLY MODULATED INDEPENDENT SPEED VARIABLE FREQUENCY GENERATOR

FIELD OF THE DISCLOSURE

This disclosure is generally related to the field of electrical generators and, in particular, externally modulated independent speed variable frequency generators.

BACKGROUND

In typical AC power generation systems, a frequency of a generated AC power signal is dependent on a rotational frequency of a rotor of the power generation system. Likewise, in a multiphase AC power generation system the frequency of each phase of a power signal is dependent on the rotational frequency of the rotor.

Independent speed variable frequency (ISVF) generators enable generation of an AC electrical power signal having a frequency that is independent of a rotor speed. In order to achieve an independent frequency, an AC power signal generated during a pilot stage may be transmitted back to a rotor of the ISVF generator. The power may then be modulated and used to generate a second magnetic flux at the rotor that rotates relative to the rotor. The second magnetic flux may be used to generate a main machine stage power signal for distribution. The frequency of the main machine stage power signal may depend on both the rotational frequency of the rotor and on the rotational frequency of the second magnetic flux. As such, the frequency is independent of the rotational frequency of the rotor alone. ISVF generators also enable control of other parameter of the main machine stage power signal, such magnitude and phase.

The inclusion of a modulation stage, such as rectifying circuitry, inverter circuitry, or other circuitry, on a rotor of a generator may add to the costs associated with the design and manufacturing of an independent speed variable frequency generator apparatus. Further, the strong rotational forces on the rotor may result in a lower life span of electrical components used to implement the rectifying circuitry and inverter circuitry. Other disadvantages may exist.

SUMMARY

Disclosed is an externally modulated ISVF generator system that resolves one or more of the disadvantages describes above. In particular, the ISVF generator system described herein may perform modulation functions external to a rotor of the ISVF generator. A high frequency modulated multiphase power signal may be generated external to the rotor, transferred to the rotor, and used directly to drive a main machine stage of the ISVF generator. As such, the rotor may exclude any modulation circuitry.

In an embodiment, an independent speed variable frequency generator system includes a rotor and a stator. The system further includes a pilot generator stage including a magnetic field source positioned on the rotor and a set of pilot multiphase windings positioned on the stator. The system also includes a high frequency transformer stage including a first set of high frequency transformer multiphase windings positioned on the stator and a second set of high frequency transformer multiphase windings positioned on the rotor. The system includes a main machine stage including a set of main field multiphase windings positioned on the rotor and a set of main armature multiphase windings positioned on the stator, where the second set of high frequency transformer multiphase windings are coupled directly to the set of main field multiphase windings. The system further includes a generator control unit.

In some embodiments, the generator control unit includes a multiphase inverter having a plurality of switching circuits, and a controller circuit, an input of each of the plurality of switching circuits coupled to the controller circuit. In some embodiments, in a motor state, the controller circuit is configured to open each of the plurality of switching circuits to prevent output at the multiphase inverter. In some embodiments, in a power generation state, the controller circuit is configured to open and close the plurality of switching circuits in a pattern that generates a high frequency modulated multiphase power signal that includes a main field multiphase power signal component that is usable to drive the set of main field multiphase windings to create a rotating magnetic flux that rotates relative to the rotor.

In some embodiments, the system includes a frequency sensor connected to an output of the multiphase inverter, where the controller circuit is configured to adjust a frequency of the main field multiphase power signal component based on a difference between a reference frequency and a main field frequency measured by the frequency sensor. In some embodiments, the system includes a voltage sensor connected to an output of the set of main armature multiphase windings, where the controller circuit is configured to adjust a voltage of the main field multiphase power signal component based on a difference between a reference voltage and an output voltage measured by the voltage sensor. In some embodiments, the system includes an encoder configured to detect a rotational frequency of the rotor, where the controller circuit is configured to adjust a frequency of the main field multiphase power signal component based on a difference between a reference frequency and a rotor frequency measured by the encoder.

In some embodiments, the system includes an external power source, and a first switching circuit configured to open and close a connection between the pilot generator stage and the generator control unit and to open and close a connection between the external power source and the generator control unit. In some embodiments, the system includes a motor start driver, and a second switching circuit configured to open and close a connection between the fourth set of multiphase windings and a power distribution bus and to open and close a connection between the fourth set of multiphase windings and the motor start driver.

In an embodiment, a method for independent speed variable frequency power generation includes generating a high frequency modulated multiphase power signal at a generator control unit positioned external to a rotor of an independent speed variable frequency generator, the high frequency modulated multiphase power signal including a main field multiphase power signal component. The method further includes transmitting the high frequency multiphase power signal from a stator to the rotor of the independent speed variable frequency generator via a high frequency transformer stage. The method also includes generating an asynchronous rotating magnetic flux at a set of main field multiphase windings positioned on the rotor by applying the main field multiphase power signal component of the high frequency modulated multiphase power signal to the main field multiphase winding. The method includes converting the asynchronous rotating magnetic flux into a main machine multiphase power signal at a set of main armature multiphase windings positioned on the stator.

In some embodiments, the method includes connecting a set of pilot multiphase windings positioned on the stator to a multiphase rectifier of the generator control unit, generating, at a magnetic field source positioned on the rotor, a synchronous rotating magnetic flux that rotates synchronously with the rotor, converting the synchronous rotating magnetic flux into a pilot multiphase power signal using the set of pilot multiphase windings, rectifying, at the generator control unit, the pilot multiphase power signal to generate a rectified power signal, and using the rectified power signal to generate the high frequency modulated multiphase power signal.

In some embodiments, the method includes connecting an external power source to the generator control unit, and using a power signal from the external power source to generate the high frequency modulated multiphase power signal. In some embodiments, generating the high frequency modulated multiphase power signal includes opening and closing a plurality of switching circuits in a pattern that generates the high frequency modulated multiphase power signal at a controller circuit of the generator control unit.

In some embodiments, the method includes, before generating the high frequency modulated multiphase power signal, connecting a motor start driver to the set of main armature multiphase windings, opening the plurality of switching circuits to prevent output at the multiphase inverter, and sending a current pattern from the motor start driver through the set of main armature multiphase windings to generate a rotating magnetic flux pattern that causes the rotor to turn, enabling startup of an engine.

In some embodiments, the method includes after startup of the engine, disconnecting the set of main armature multiphase windings from the motor start driver, and connecting the set of main armature multiphase windings to a power distribution bus.

In some embodiments, the method includes receiving a main field frequency signal, receiving a reference frequency signal, and adjusting a frequency of the main field multiphase power signal component of the high frequency modulated multiphase power signal based on a difference between the main field frequency signal and the reference frequency signal. In some embodiments, the method includes receiving an output voltage signal, receiving a reference voltage signal, and adjusting a voltage of the main field multiphase power signal component of the high frequency modulated multiphase power signal based on a difference between the reference voltage and the output voltage. In some embodiments, the method includes receiving a rotor frequency signal, receiving a reference frequency signal, and adjusting a frequency of the main field multiphase power signal component of the high frequency modulated multiphase power signal based on a difference between the rotor frequency signal and the reference frequency signal.

In an embodiment, an independent speed variable frequency generator system includes a rotor and a stator. The system further includes a high frequency transformer stage including a first set of high frequency transformer multiphase windings positioned on the stator and a second set of high frequency transformer multiphase windings positioned on the rotor. The system also includes a main machine stage including a set of main field multiphase windings positioned on the rotor and a set of main armature multiphase windings positioned on the stator, where the second set of high frequency transformer multiphase windings is coupled directly to the set of main field multiphase windings.

In some embodiments, the system includes a generator control unit configured to generate a high frequency modulated multiphase power signal that includes a main field multiphase power signal component that is usable to drive the set of main field multiphase windings to create an asynchronous rotating magnetic flux that rotates relative to the rotor.

Figure 1:
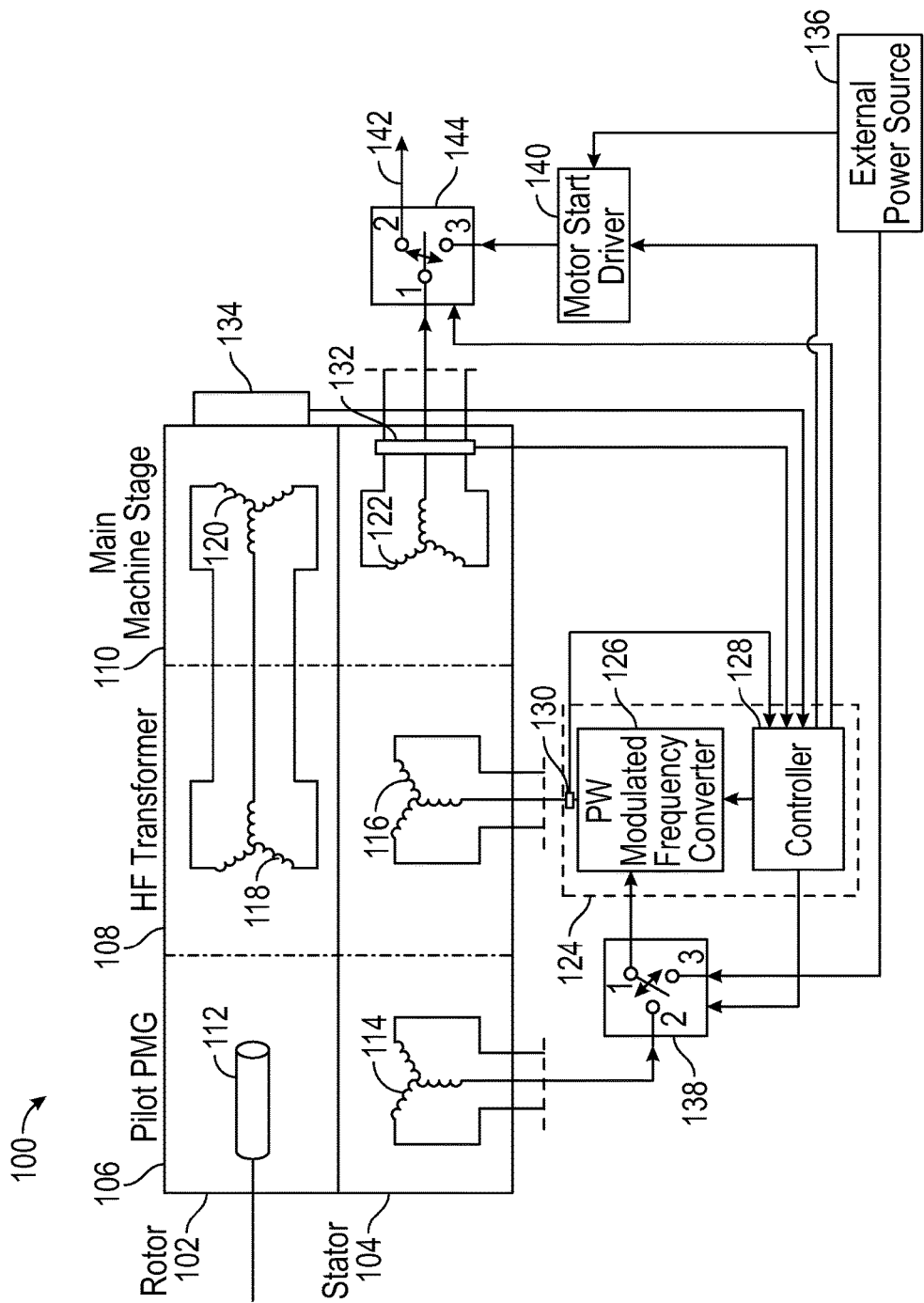
FIG. 1 is a schematic block diagram depicting an embodiment of an externally modulated independent speed variable frequency generator system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

As described above, ISVF generators enable generation of a multiphase power signal having a frequency that is independent of a rotational frequency of a generator rotor. A non-limiting example of an ISVF apparatus is described in U.S. patent application Ser. No. 15/819,919, filed on Nov. 21, 2017 and entitled "Independent Speed Variable Frequency Alternating Current Generator." Another non-limiting example of a system that incorporates an ISVF generator apparatus, as both a generator and a starter, is described in U.S. patent application Ser. No. 15/872,383, filed on Jan. 16, 2018 and entitled "System and Method for Operating an Independent Speed Variable Frequency Generator as a Starter." Another non-limiting example of a system incorporating an ISVF generator apparatus is described in U.S. patent application Ser. No. 15/866,064, filed on Jan. 9, 2018 and entitled "Independent Speed Variable Frequency Based Electrified Propulsion System Architecture." Each of the above listed patent applications are incorporated herein by reference in their entireties.

Referring to FIG. 1, an embodiment of an externally modulated ISVF generator system 100 is depicted. The system 100 may include a rotor 102 and a stator 104. The rotor 102 may be configured to rotate relative to the stator 104 to generate power in stages as described herein. The system 100 may include a pilot stage 106, a high frequency transformer stage 108, and a main machine stage 110.

The pilot stage may include a magnetic field source 112 coupled to the rotor 102 and a first set of multiphase windings 114 (also referred to as a set of pilot multiphase windings to differentiate the first set of multiphase windings 114 from other sets of multiphase windings of the system 100). As depicted in FIG. 1, the first set of multiphase windings 114 may be configured to generate a 3-phase power signal. However, the disclosure is not limited to 3-phase systems. More or fewer than 3-phases are possible. Further, the magnetic field source 112 may include a permanent magnet or another type of magnetic source, such as a set of induction generator windings.

The high frequency transformer stage 108 may include a second set of multiphase windings 116 (also referred to as a first set of high frequency multiphase windings) and a third set of multiphase windings 118 (also referred to as a second set of high frequency multiphase windings). The second set of multiphase windings 116 and the third set of multiphase windings 118 may be configured to enable the transmission of high frequency modulated power signals from the stator 104 to the rotor 102. As used herein, the term "high frequency modulated" means a signal having a modulation component with a frequency that exceeds a rotational frequency of the rotor 102.

The main machine stage 110 may include a fourth set of multiphase windings 120 (also referred to as a main field multiphase winding) and a fifth set of multiphase windings 122 (also referred to as a main armature multiphase winding). As depicted in FIG. 1, the second set of multiphase windings 118 may be coupled directly to the set of main field multiphase windings 120. As used herein, being coupled directly means that there is no intervening modulation circuitry, such as a rectifier or inverter, connected between the third set of multiphase windings 118 (i.e., the second set of high frequency transformer multiphase windings) and the fourth set of multiphase windings 120 (i.e., the set of main field multiphase windings).

The system 100 may further include a generator control unit 124. The generator control unit 124 may include a pulse-width-modulated frequency converter 126 and a controller circuit 128. The pulse-width-modulated frequency converter 126 is further described herein. The controller circuit 128 may be configured to control the pulse-width-modulated frequency converter 126 to modulate and convert a multiphase power signal to produce a high frequency modulated multiphase power signal for transmission via the second set of multiphase windings 116 and the third set of multiphase windings 118.

The controller circuit 128 may include any logic circuitry or processor, such as a microprocessor, with associated software to perform control functions, as described herein. For example, in some embodiments the controller circuit 128 may include a central processing unit (CPU), a graphical processing unit (GPU), a digital signal processor (DSP), a peripheral interface controller (PIC), another type of microprocessor, and/or combinations thereof. It may be implemented as an integrated circuit, a field programmable gate array (FPGA), an application specific integrated circuit (ASIC), a combination of logic gate circuitry, other types of digital or analog electrical design components, or combinations thereof.

The system 100 may include feedback sensors to enable the controller circuit 128 to perform control functions related to generating the high frequency modulated multiphase power signal. For example, the system 100 may include a frequency sensor 130 connected to an output of the pulse-width-modulated frequency converter 126. The frequency sensor 130 may be configured to detect a frequency of a multiphase power signal component of the high frequency modulated multiphase power signal generated by the pulse-width-modulated frequency converter 126. Based on a difference of the measured frequency and a reference frequency (e.g., a desired frequency output of a power signal generated by the main machine stage 110), the controller circuit 128 may adjust the pulse-width-modulated frequency converter 126 to achieve the reference frequency.

The system 100 may further include a voltage sensor 132 connected to an output of the set of main armature multiphase windings 122. The voltage sensor 132 may determine a magnitude of the voltage produced by the main machine stage 110. The measured voltage may also be used by the controller circuit 128 to adjust a magnitude of a voltage of the multiphase power signal component of the high frequency modulated multiphase power signal generated by the pulse-width-modulated frequency converter 126 based on a difference of the measured voltage and a reference voltage.

The system 100 may also include an encoder 134 positioned in proximity to the rotor 102 and configured to detect a rotational frequency of the rotor 102. The rotational frequency of the rotor 102 may be used by the controller circuit 128 in determining a frequency of the multiphase power signal component of the high frequency modulated multiphase power signal generated by the pulse-width-modulated frequency converter 126.

The system 100 may include an external power source 136 and a first switching circuit 138. The external power source 136 may include a ground-based power distribution system, a generator, a battery, or combinations thereof and may be fixed or moveable relative to the system 100. The first switching circuit 138 may be configured to open and close a connection between the generator control unit 124 and the pilot stage 106 and to open and close a connection between the generator control unit 124 and the external power source 136. Although FIG. 1 depicts the inputs and output of the first switching circuit 138 as a single line, it should be understood that the inputs and output may represent multi-phase power inputs and outputs. In particular, the inputs and output of the first switching circuit 138 may be configured to three-phase power signals. The first switching circuit 138 may include a physical switch or logical switching circuitry configured to selectively open and close electrical connections.

The system may include a motor start driver 140, a distribution bus 142 and a second switching circuit 144. The motor start driver 140 may include circuitry configured to apply a current pattern to a motor in order to cause an engine to turn over and start. For example, the motor start driver 140 may be configured to apply a field-oriented control (FOC) signal or generating a direct torque control (DTC) signal to the set of main armature multiphase windings 122. The motor start driver 140 may include different types of variable frequency motor drive (VFMD) topologies. The second switching circuit 144 may be configured to open and close a connection between the motor start driver 140 and the set of main armature multiphase windings 122 and to open and close a connection between the distribution bus 142 and the set of main armature multiphase windings 122. As with the first switching circuit 138, although FIG. 1 depicts the inputs and output of the second switching circuit 144 as a single line, it should be understood that the inputs and output may represent multi-phase power inputs and outputs. The second switching circuit 144 may include a physical switch or logical switching circuitry configured to selectively open and close electrical connections.

During operation, the system 100 may be operated in different states, or modes of operation. In a first state, the system 100 may be configured to generate power based on rotation of the rotor 102 by a prime mover (e.g., an engine). In a second state, the system 100 may be configured to generate or convert power based on power received from the external power source 136. In a third state, the system 100 may be configured for use as a motor, or starter, to start an engine. Other states or combinations of states are also possible.

While in the first state, the first switching circuit may be configured to close a connection between (i.e., to connect) the first set of multiphase windings 114 and the generator control unit 124 and to open a connection between (i.e., disconnect) the external power source 136 and the generator control unit 124.

A prime mover (such as a vehicle engine) may rotate the rotor 102 causing the magnetic field source 112 attached to the rotor 102 to also rotate, thereby generating a magnetic flux at the pilot stage 106. The rotating magnetic flux may be used to generate a pilot multiphase power signal at the first set of multiphase windings 114. Because a rotational frequency of the rotating magnetic flux is dependent on the rotational frequency of the rotor 102, the rotating magnetic flux may be considered synchronous, meaning the magnetic flux is synchronous with the rotor 102. The pilot multiphase power signal may be used as input to the pulse-width-modulated frequency converter 126 of the generator control unit 124.

The controller circuit 128 may rely on feedback received from the frequency sensor 130, the voltage sensor 132, and the encoder 134 to generate a high frequency modulated multiphase power signal that includes a high frequency modulation component and a lower frequency multiphase power signal component. The high frequency modulated multiphase power signal may be transmitted from the second set of multiphase windings 116 on the stator 104 to the third set of multiphase windings 118 on the rotor 102.

The fourth set of multiphase windings 120 may be coupled directly to the third set of multiphase windings 118. As such, the high frequency modulated multiphase power signal may be transferred directly to the fourth set of multiphase windings 120. Due to natural inductances exhibited by the third and fourth sets of multiphase windings 118, 120, the high frequency modulation component of the high frequency modulated multiphase power signal may be filtered out with only the multiphase power signal component remaining. In some embodiments, additional circuitry may be included to filter the high frequency modulated component. The remaining multiphase power signal component may drive a current at the fourth set of multiphase windings 120, thereby generating a magnetic flux.

The controller circuit 128 may signal the pulse-width-modulated frequency converter 126 to generate the multiphase power signal component having a frequency that causes the magnetic flux at the fourth set of multiphase windings 120 to rotate relative to the rotor 102. As such, a frequency of the rotating magnetic flux at the fourth set of multiphase windings 120 is a combination of the rotational frequency of the rotor 102 and of the frequency of the rotating magnetic flux at the fourth set of multiphase windings 120. The rotating magnetic flux may be asynchronous because its rotational frequency is not dependent on the rotational frequency of the rotor 102 alone. In other words, the rotating magnetic flux may be asynchronous with the rotor 102.

The rotating magnetic flux may be used to generate a main stage multiphase power signal at the fifth set of multiphase windings 122. The main stage multiphase power signal may be distributed via the distribution bus 142. In this way, a frequency, voltage, and phase of the power signal at the distribution bus 142 may be controlled by the generator control unit 124 and may be independent from the rotational frequency of the rotor 102.

While in the second state, the first switching circuit 138 may be configured to open a connection (i.e., to disconnect) between the first set of multiphase windings 114 and the generator control unit 124 and to close (i.e., connect) a connection between the external power source 136 and the generator control unit 124. In this state, the external power source 136 may drive the pulse-width-modulated frequency converter 126 instead of the pilot stage 106. The system 100 then functions as a power converter to convert a frequency, voltage, phase, or any combinations thereof to a multiphase power signal having parameters specific to the distribution bus 142.

While in the third state, the second switching circuit 144 may be configured to close a connection between (i.e., connect) the motor start driver 140 and the fifth set of multiphase windings 122 (i.e., the set of main armature multiphase windings) and to open a connection between (i.e., disconnect) the distribution bus 142 and the fifth set of multiphase windings 122.

In this state, the controller circuit 128 may prevent output at the pulse-width modulated frequency converter 126. The third and fourth sets of multiphase windings 118, 120 may then be operated as an induction motor. The motor start driver 140 may be configured to send a current pattern through the fifth set of multiphase windings 122 to generate a rotating magnetic flux pattern that interacts with the fourth set of multiphase windings 120 and causes the rotor 102 to turn. As the rotor 102 turns, it may enable startup of an engine.

A benefit of the system 100 is that modulation and conversion of the multiphase power signal used to drive the set of main field multiphase windings may occur external to the rotor 102. This limits the number of electrical components that may be positioned on the rotor 102, resulting in a longer lifespan and lower complexity of the rotor 102. Other benefits and advantages may exist.

Figure 2:
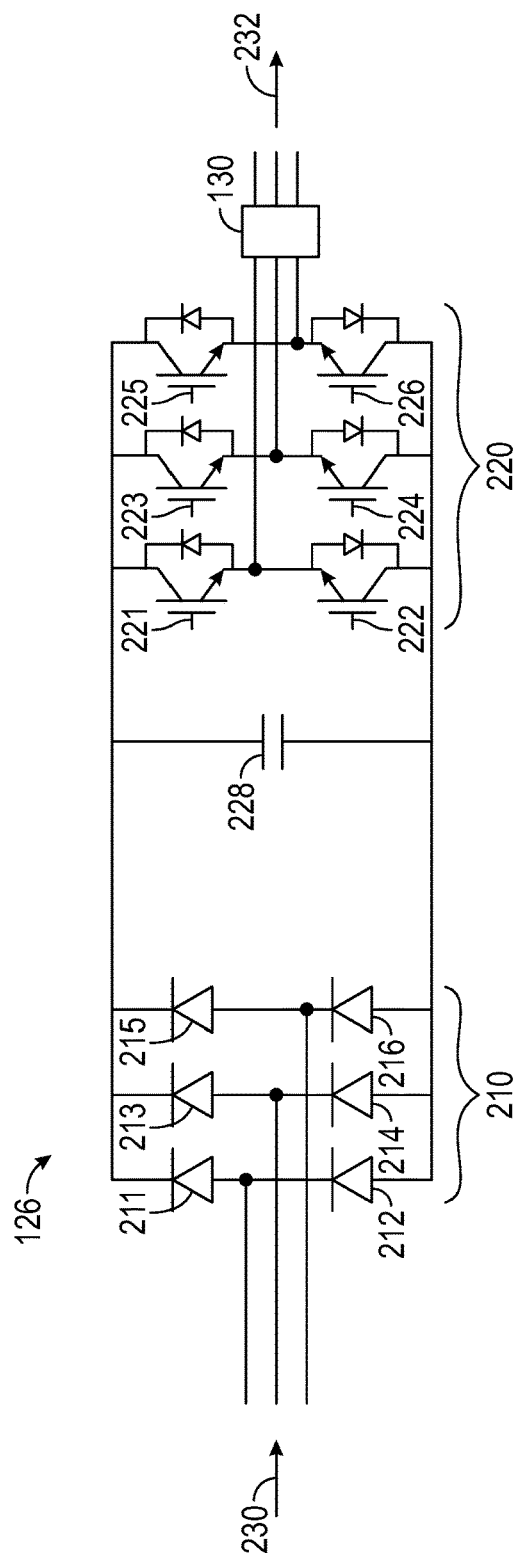
FIG. 2 is a schematic block diagram depicting an embodiment of a pulse-width-modulated frequency converter.

Referring to FIG. 2, an embodiment of a pulse-width-modulated frequency converter 126 is depicted. The pulse-width-modulated frequency converter 126 may include a rectifier 210 and an inverter 220. The rectifier 210 may include a first set of diodes 211, 213, 215 and a second set of diodes 212, 214, 216. Each of the first set of diodes 211, 213, 215 may be paired with a corresponding diode of the second set of diodes 212, 214, 216, each pair to rectify a single phase of an incoming multiphase power signal 230. For example, the diode 211 may be paired the diode 212, the diode 213 may be paired with the diode 214, and the diode 215 may be paired with the diode 216.

It should be noted that although FIG. 2 depicts the rectifier 210 as performing three-phase rectification, more or fewer than three phases may be rectified. Further, FIG. 2 depicts only one embodiment of a rectifier topology. Other topologies may be used as would be appreciated by persons of ordinary skill in the art having the benefit of this disclosure.

The inverter 220 may include a first set of switches 221, 223, 225 and a second set of switches 222, 224, 226. Each of the first set of switches 221, 223, 225 may be paired with a corresponding switch of the second set of switches 222, 224, 226, each pair to selectively generate a phase of a high frequency modulated multiphase power signal 232. For example, the switch 221 may be paired with the switch 222, the switch 223 may be paired with the switch 224, and the switch 225 may be paired with the switch 226. The controller circuit 128 (shown in FIG. 1) may be coupled to each input of the switches 221-226.

A capacitor 228 may hold a DC voltage level of the rectified DC power signal during operation. An output of the inverter 220 may be connected to the frequency sensor 130.

During power generation, inputs of each of the switches 221-226 may be operated to modulate the DC power signal from the rectifier 210 to generate a high frequency modulated multiphase power signal 232. The high frequency modulated multiphase power signal may include a modulation component that includes a high frequency modulation component and a multiphase power signal component. The multiphase power signal component may be usable to drive the fourth set of multiphase windings 120 (shown in FIG. 1) to generate a rotating magnetic flux that rotates relative to the rotor 102 (shown in FIG. 1).

In another state, each of the switches 221-226 may be opened (i.e., preventing the passage of current and voltage through the switches 221-226). In this state, no output is generated by the multiphase inverter 220. This state may be used to operate the system 100 (shown in FIG. 1) as a motor.

In practice, additional components may be included within the switching topology of the inverter 220. For example, each of the switches 221-226 may include a switch-diode pair. Further, various types of switches may be usable with the disclosure including metal-oxide semiconductor field-effect transistors (MOSFETs), insulated gate bipolar transistors (IGBTs), and/or other types of semiconductor switches. Although FIG. 2 depicts six switches 221-226, the inverter 220 may include more or fewer than six in order to generate multiphase power signals having different numbers of phases.

A benefit of the pulse-width-modulated frequency converter 126 is that it may be positioned on the stator 104 of the system 100 rather than attached to the rotor 102. Thus, the rotor may be manufactured with less cost and the components used to construct the pulse-width modulated frequency converter 126 need not withstand strong rotational forces associated with the rotor 102. Other benefits and advantages may exist.

Figure 3:
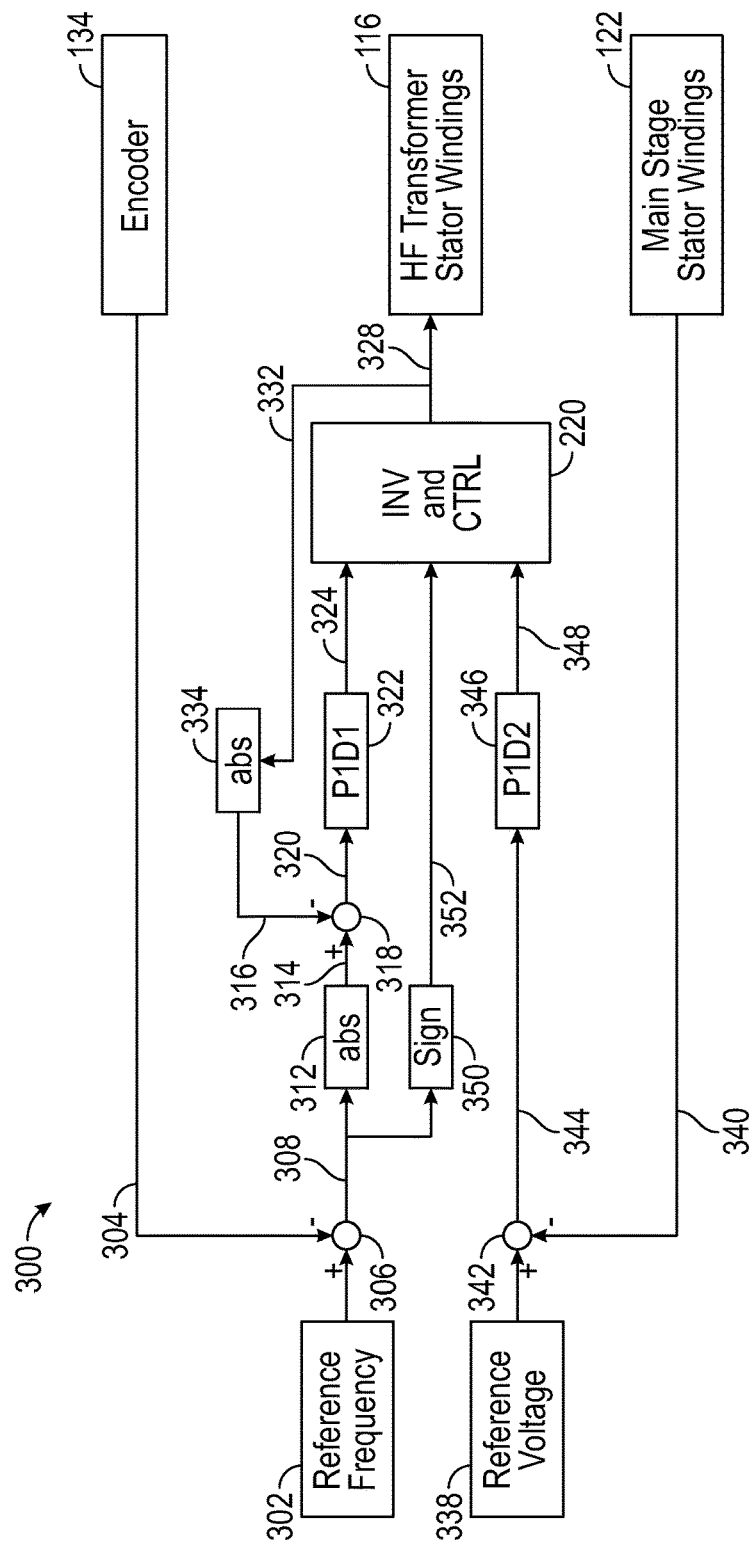
FIG. 3 is block diagram depicting an embodiment of a signal control system for an independent speed variable frequency AC generator system.

Referring to FIG. 3, a control signal system 300 for an externally modulated ISVF generator is depicted. The control signal system 300 is functionally depicted as including summing points 306, 318, 342, absolute value functions 312, 334, and a sign function 350. Although depicted functionally, each of these elements may be implemented using structural components. For example, summing points 306, 318, 342 and the absolute value functions 312, 334 may be implemented as either logic hardware (digital logic gates or analog comparator circuitry) or software running on a processor within the controller circuit 128 (shown in FIG. 1). The hardware associated with these functions may be external to the rotor 102 of FIG. 1.

The system 300 may receive a reference frequency signal 302. The reference frequency signal 302 may represent a desired frequency for a multiphase power distribution system. In particular, the multiphase power distribution system may be used for aerospace applications and may supply power to a propulsion motor and/or other systems and devices. The reference frequency signal 302 may be a constant input signal "hardwired" into the generator control unit 124 (shown in FIG. 1) or it may be an adjustable input. For example, the system 300 may be configured to generate power signals of variable frequencies in order to meet the needs of a particular load. When the load is motor, the system 300 can output variable frequencies to meet the speed change need. In cases where a constant frequency is desired, it can output a fixed frequency. The reference frequency signal 302 may be generated through software running at a processor (e.g., a processor of the generator control unit 124) or through other logic and/or hardware. As such, the reference frequency signal 302 may be static or dynamic, and may be modified based on a particular load.

The reference frequency signal 302 may be combined with a rotor frequency signal 304 at a first summing point 306, and may produce a first intermediate signal 308 that represents a difference between the reference frequency signal 302 and the rotor frequency signal 304. Conceptually, the first intermediate signal 308 may represent a desired change in the rotational frequency of a rotating magnetic field from a measured rotational frequency of the rotor 102 (shown in FIG. 1).

As a non-limiting example, the reference frequency signal 302 may be equal to 400 Hz. If the rotor frequency signal 304 is equal to 300 Hz, then the first intermediate signal 308 would be equal to 100 Hz, which represents a desired increase in frequency from the rotational frequency (i.e., 300 Hz) of the rotor 102 in order to equal the reference frequency signal 302 (i.e., 400 Hz).

The first intermediate signal 308 may be input into an absolute value function 312 to generate a magnitude signal 314 of the first intermediate signal 308. At a second summing point 318, the magnitude signal 314 of the first intermediate signal 308 may be combined with a magnitude signal 316 of a main field frequency signal 332 (measured by the frequency sensor 130 of FIG. 1) to produce a second intermediate signal 320. The second intermediate signal 320 may represent a difference between the magnitudes of first intermediate signal 308 and the main field frequency signal 332. In other words, the second intermediate signal 320 may represent a desired change in the rotational frequency of a main rotating magnetic field relative to a current rotational frequency of the main rotating magnetic field at a set of main machine stage windings (e.g., the fourth set of multiphase windings 120). In continuing the example above, if the main field frequency signal 332 is equal to 90 Hz, then the second intermediate signal 320 would equal 10 Hz, which represents a desired increase in the rotational frequency of a rotating magnetic field relative to a rotor (e.g., the rotor 102 of FIG. 1).

In other words, in the illustrative example, the main rotating magnetic field may be rotating at a frequency of 90 Hz relative to the rotor 102, and the rotor 102 may be rotating at a frequency of 300 Hz relative to the stator 104. Therefore, the main rotating magnetic field may be rotating at a frequency of 390 Hz relative to the stator 104. In order to produce a power signal with a frequency of 400 Hz, the rotational frequency of the main rotating magnetic field would need to increase by 10 Hz. As such, in this example, the second intermediate signal 320 would be equal to 10 Hz.

The second intermediate signal 320 may be provided to a first proportional-integral-derivative (PID) controller 322. The first PID controller 322 may convert the second intermediate signal 320 into an inverter control signal 324 that directs an inverter 220 to adjust a multiphase power signal component 328 of a high frequency modulated multiphase power signal ultimately provided to a main machine stage of a rotor. The multiphase power signal component 328, when passed as current through a set of main machine stage multiphase windings (e.g., the fourth set of multiphase windings 120 of FIG. 1) may create a rotating magnetic field, where a frequency, magnitude, and phase of the rotating magnetic field depends on a frequency, magnitude, and phase of the multiphase power signal component 328.

By adjusting the multiphase power signal component 328, the inverter 220 may control a rotation of the rotating magnetic field relative to the rotor 102, thereby separating the rotational frequency of the rotating magnetic field from a rotational frequency of the rotor 102. The first PID controller 322 may be part of the controller circuit 128 of FIG. 1.

From the multiphase power signal component 328, the main field frequency signal 332 may be measured and derived for use as a feedback signal at the second summing point 318. The main field frequency signal 332 may be passed through an absolute value function 334 to produce the magnitude signal 316 of the main field frequency signal 232 used at the second summing point 318. Likewise, a rotor speed encoder 134 may measure and derive a rotor frequency signal 304 based on a rotational frequency of the rotor 102. The rotor frequency signal 304 may be provided as a feedback signal used at the first summing point 306.

The first intermediate signal 308 may also be passed to the sign function 350. The sign function 350 may convert the first intermediate signal 308 into a direction signal 352. The direction signal 352 may indicate a desired rotational direction of a rotating magnetic field relative to the rotor 102. A negative direction signal may indicate that the desired rotational frequency is less than the rotational frequency of the rotor 102. A positive direction signal may indicate that the desired rotational frequency is greater than a rotational frequency of the rotor 102. The direction signal 352 may be used by the inverter 220 to control the multiphase power signal component 328 to implement a desired direction of rotation of the rotating magnetic field relative to the rotor 102.

The system 300 may further receive a reference voltage signal 338. The reference voltage signal 338 may represent a desired voltage for a multiphase power distribution system. In particular, the multiphase power distribution system may be used for aerospace applications and may supply power to a propulsion motor and/or other systems and devices. The reference voltage signal 338 may be a constant input signal "hardwired" into the generator control unit 124 or it may be an adjustable input. It may be generated through software running at a processor (e.g., a processor of the generator control unit 124) or through other logic and/or hardware. In an illustrative example, the reference voltage signal 338 may be equal to 105 VAC or 230 VAC.

The reference voltage signal 338 may be combined with a stator output voltage signal 340 at a third summing point 342, and may produce a third intermediate signal 344 that represents a difference between the reference voltage signal 338 and the stator output voltage signal 340. Conceptually, the third intermediate signal 344 may represent a desired change in the voltage produced at a main stage stator winding (e.g., the fifth set of multiphase windings 122 of FIG. 1).

The third intermediate signal 344 may be provided to a second PID controller 346. The second PID controller 346 may convert the third intermediate signal 340 into an inverter control signal 348 that directs an inverter 220 to adjust the multiphase power signal component 328. In particular, a magnitude of the multiphase power signal component 328 may be adjusted to increase or decrease the magnitude of the rotating magnetic field, thereby resulting in a higher or lower voltage produced at the main stage stator winding (e.g., the fifth set of multiphase windings 122). As with the first PID controller 322, the second PID controller 346 may be part of the controller circuit 128.

Each of the components described in FIG. 3 may be external to the rotor 102 of the system 100. A benefit of the system 300 is that by being external to the rotor 102, rotational forces applied to the system 300 may be reduced adding to the lifespan of the system 300. Other benefits and advantages may exist.

Figure 4:
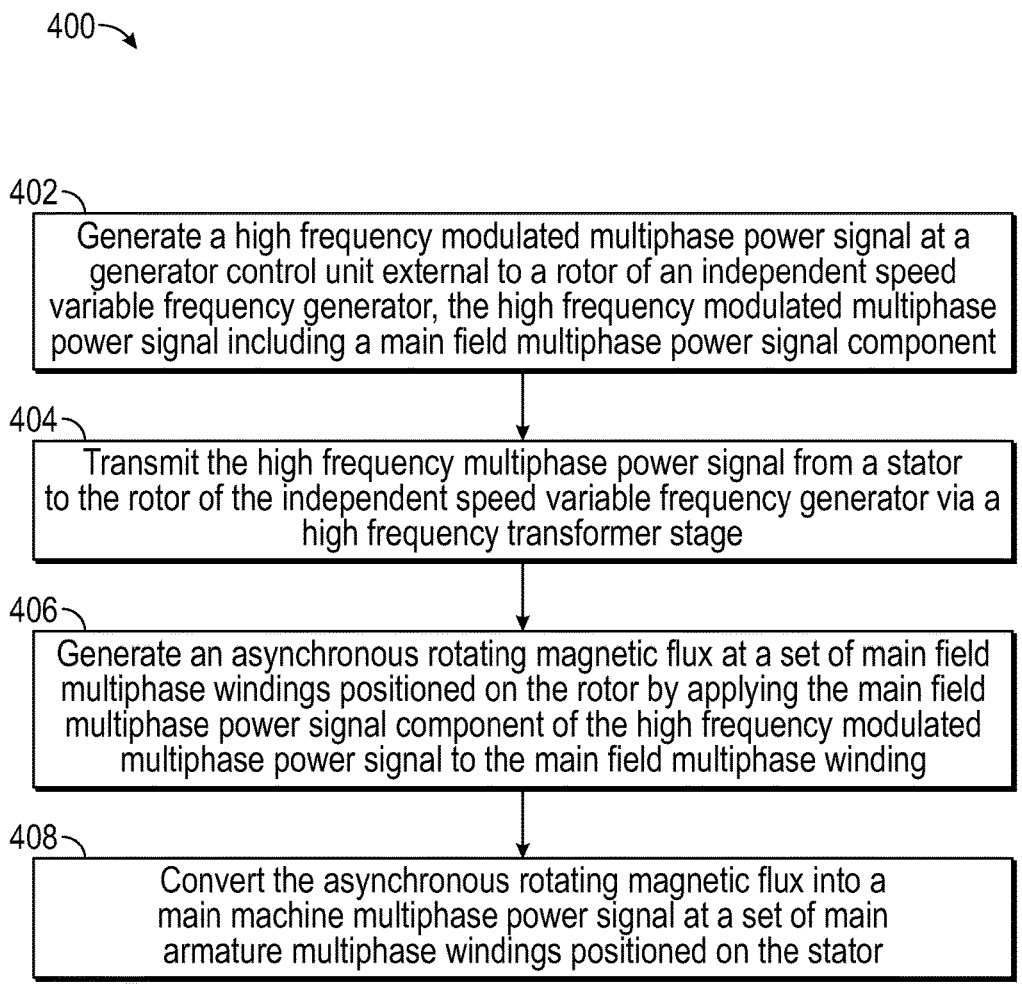
FIG. 4 is a flow diagram depicting an embodiment of a method for externally modulated independent speed variable frequency electrical power generation.

Referring to FIG. 4, an embodiment of a method 400 for externally modulated independent speed variable frequency electrical power generation is depicted. The method 400 may include generating a high frequency modulated multiphase power signal at a generator control unit positioned external to a rotor of an independent speed variable frequency generator, at 402. The high frequency modulated multiphase power signal including a main field multiphase power signal component. For example, the generator control unit 124 may generate a high frequency modulated multiphase power signal.

The method 400 may further include transmitting the high frequency multiphase power signal from a stator to the rotor of the independent speed variable frequency generator via a high frequency transformer stage, at 404. For example, the high frequency modulated multiphase power signal may be transmitted from the stator 104 to the rotor 102 via the high frequency transformer stage 108.

The method 400 may also include generating an asynchronous rotating magnetic flux at a set of main field multiphase windings positioned on the rotor by applying the main field multiphase power signal component of the high frequency modulated multiphase power signal to the main field multiphase winding, at 406. For example, an asynchronous rotating magnetic flux may be generated at the fourth set of multiphase windings 120.

The method 400 may include converting the asynchronous rotating magnetic flux into a main machine multiphase power signal at a set of main armature multiphase windings positioned on the stator, at 408. For example, the asynchronous rotating magnetic flux may be converted into a main machine multiphase power signal at the fifth set of multiphase windings 122.

An advantage of the method 400 is that an asynchronous rotating magnetic flux may be generated without having modulation circuitry positioned on the rotor of the independent speed variable frequency generator. Other benefits and advantages may exist.

Figure 5:
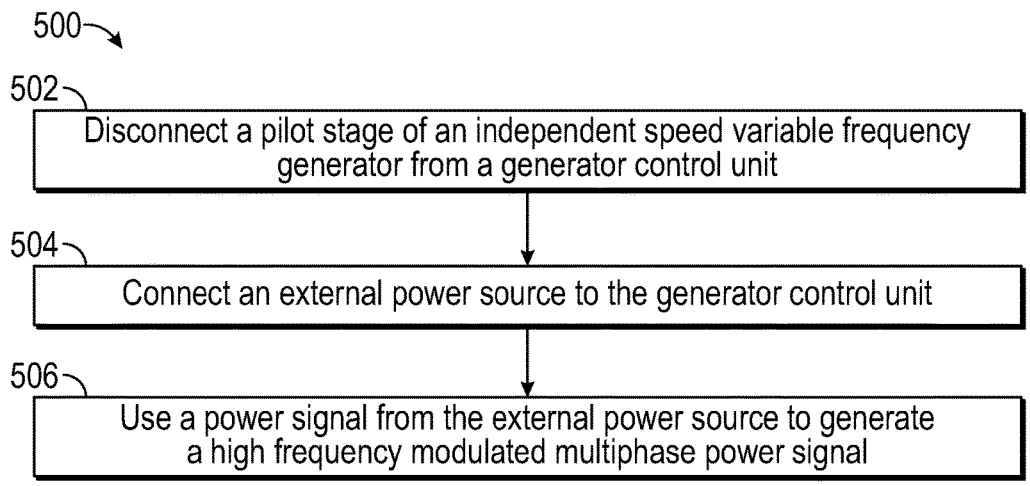
FIG. 5 is a flow diagram depicting an embodiment of a method for externally modulated independent speed variable frequency electrical power generation.

Referring to FIG. 5, an embodiment of a method 500 for externally modulated independent speed variable frequency electrical power generation is depicted. The method 500 may be used in situations where a pilot stage (e.g., the pilot stage 106) is unavailable for any variety of reasons.

The method 500 may include disconnecting a pilot stage from a generator control unit, at 502. For example, the pilot stage 106 may be disconnected from the generator control unit using the first switching circuit 138.

The method 500 may include connecting an external power source to a generator control unit, at 504. For example, the external power source 136 may be connected to the generator control unit 124 using the first switching circuit 138.

The method 500 may further include using a power signal from the external power source to generate a high frequency modulated multiphase power signal, at 506. For example, the generator control unit 124 may generate a high frequency modulated multiphase power signal using a multiphase power signal received from the external power source 136.

After the method 500 has been completed, the method 400 may be used to generate a multiphase power signal that is independent from a rotational frequency of the rotor 102 relying on the external power source for power to generate the high frequency modulated multiphase power signal. A benefit of the method 500 is that an external power source 136 may provide the electrical power for generating the high frequency modulated multiphase power signal for use at the main machine stage 110 of the system 100 instead of using power from the pilot stage 106. Other benefits and advantages may exist.

Figure 6:
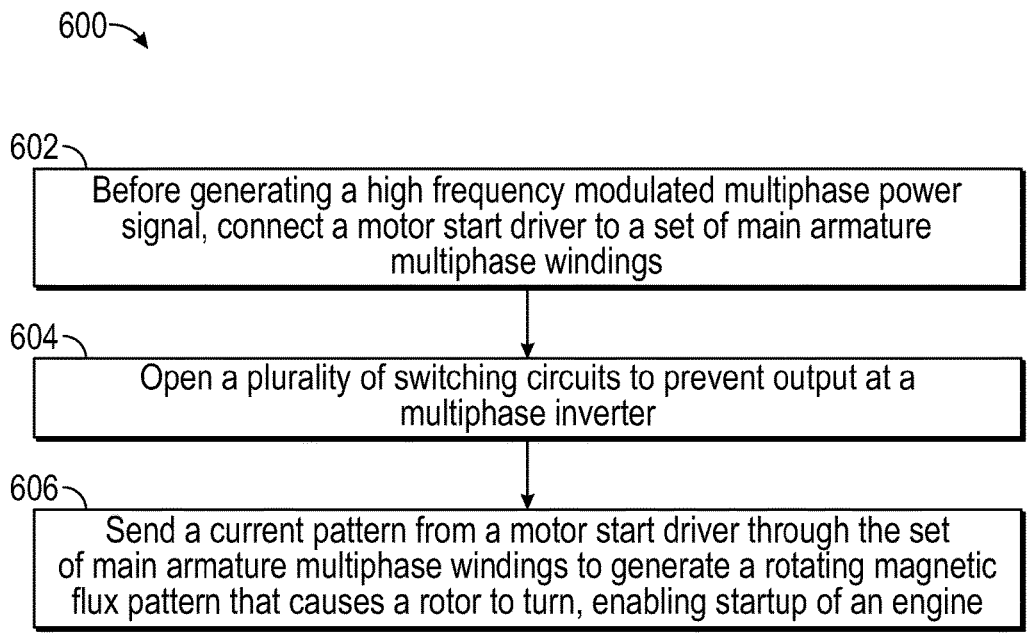
FIG. 6 is a flow diagram depicting an embodiment of a method for operating an externally modulated independent speed variable frequency generator system as a starter.

Referring to FIG. 6, an embodiment of a method 600 for operating an externally modulated independent speed variable frequency generator system as a starter is depicted. The method 600 may include before generating a high frequency modulated multiphase power signal, connecting a motor start driver to the set of main armature multiphase windings, at 602. For example, the switching circuit 144 may be controlled to connect the motor start driver 140 to the fifth set of multiphase windings 122.

The method 600 may further include opening a plurality of switching circuits to prevent output at a multiphase inverter, at 604. For example, the controller circuit 128 may control the pulse-width-modulated frequency converter 126 to open the switching circuits 221-226 of the multiphase inverter 220.

The method 600 may also include sending a current pattern from the motor start driver through the set of main armature multiphase windings to generate a rotating magnetic flux pattern that causes the rotor to turn, enabling startup of an engine, at 606. For example, a current pattern may be sent from the motor start driver 140 to enable startup of an engine coupled to the rotor 102.

After the method 600 is performed and the engine is started, the methods 400 and/or 500 may be performed to generate a multiphase power signal that is independent from a rotational frequency of the rotor 102. A benefit of the method 600 may be that the system 100 may be operated as a starter for an engine coupled to the rotor 102.

Although various embodiments have been shown and described, the present disclosure is not so limited and will be understood to include all such modifications and variations as would be apparent to one skilled in the art.

What is claimed is:

1. An independent speed variable frequency generator system comprising:
    a rotor;
    a stator;
    a pilot generator stage including a magnetic field source positioned on the rotor and a set of pilot multiphase windings positioned on the stator;
    a high frequency transformer stage including a first set of high frequency transformer multiphase windings positioned on the stator and a second set of high frequency transformer multiphase windings positioned on the rotor;
    a main machine stage including a set of main field multiphase windings positioned on the rotor and a set of main armature multiphase windings positioned on the stator, wherein the second set of high frequency transformer multiphase windings are coupled directly to the set of main field multiphase windings;
    a generator control unit;
    a motor start driver; and
    a switching circuit configured to open and close a connection between the set of main armature multiphase windings and a power distribution bus and to open and close a connection between the set of main armature multiphase windings and the motor start driver.

2. The system of claim 1, wherein the generator control unit comprises:
    a multiphase inverter having a plurality of switching circuits; and
    a controller circuit, an input of each of the plurality of switching circuits coupled to the controller circuit.

3. The system of claim 2, wherein, in a motor state, the controller circuit is configured to open each of the plurality of switching circuits to prevent output at the multiphase inverter.

4. The system of claim 2, wherein, in a power generation state, the controller circuit is configured to open and close the plurality of switching circuits in a pattern that generates a high frequency modulated multiphase power signal that includes a main field multiphase power signal component that is usable to drive the set of main field multiphase windings to create a rotating magnetic flux that rotates relative to the rotor.

5. The system of claim 4, further comprising:
    a frequency sensor connected to an output of the multiphase inverter, wherein the controller circuit is configured to adjust a frequency of the main field multiphase power signal component based on a difference between a reference frequency and a main field frequency measured by the frequency sensor.

6. The system of claim 4, further comprising:
    a voltage sensor connected to an output of the set of main armature multiphase windings, wherein the controller circuit is configured to adjust a voltage of the main field multiphase power signal component based on a difference between a reference voltage and an output voltage measured by the voltage sensor.

7. The system of claim 4, further comprising:
    an encoder configured to detect a rotational frequency of the rotor, wherein the controller circuit is configured to adjust a frequency of the main field multiphase power signal component based on a difference between a reference frequency and a rotor frequency measured by the encoder.

8. The system of claim 1, further comprising:
    an external power source; and
    another switching circuit configured to open and close a connection between the pilot generator stage and the generator control unit and to open and close a connection between the external power source and the generator control unit.

9. A method for independent speed variable frequency power generation comprising:
    generating a high frequency modulated multiphase power signal at a generator control unit positioned external to a rotor of an independent speed variable frequency generator, the high frequency modulated multiphase power signal including a main field multiphase power signal component, wherein generating the high frequency modulated multiphase power signal comprises opening and closing a plurality of switching circuits of a multiphase inverter in a pattern that generates the high frequency modulated multiphase power signal at a controller circuit of the generator control unit;
    transmitting the high frequency multiphase power signal from a stator to the rotor of the independent speed variable frequency generator via a high frequency transformer stage;
    generating an asynchronous rotating magnetic flux at a set of main field multiphase windings positioned on the rotor by applying the main field multiphase power signal component of the high frequency modulated multiphase power signal to the main field multiphase winding; and converting the asynchronous rotating magnetic flux into a main machine multiphase power signal at a set of main armature multiphase windings positioned on the stator; and before generating the high frequency modulated multiphase power signal:
  connecting a motor start driver to the set of main armature multiphase windings;
  opening the plurality of switching circuits to prevent output at the multiphase inverter; and
  sending a current pattern from the motor start driver through the set of main armature multiphase windings to generate a rotating magnetic flux pattern that causes the rotor to turn, enabling startup of an engine.

10. The method of claim 9, further comprising:
connecting a set of pilot multiphase windings positioned on the stator to a multiphase rectifier of the generator control unit; generating, at a magnetic field source positioned on the rotor, a synchronous rotating magnetic flux that rotates synchronously with the rotor;
converting the synchronous rotating magnetic flux into a pilot multiphase power signal using the set of pilot multiphase windings;
rectifying, at the generator control unit, the pilot multiphase power signal to generate a rectified power signal; and
using the rectified power signal to generate the high frequency modulated multiphase power signal.

11. The method of claim 9, further comprising:
connecting an external power source to the generator control unit; and
using a power signal from the external power source to generate the high frequency modulated multiphase power signal.

12. The method of claim 9, further comprising:
after startup of the engine, disconnecting the set of main armature multiphase windings from the motor start driver; and
connecting the set of main armature multiphase windings to a power distribution bus.

13. The method of claim 9, further comprising:
receiving a main field frequency signal;
receiving a reference frequency signal; and
adjusting a frequency of the main field multiphase power signal component of the high frequency modulated multiphase power signal based on a difference between the main field frequency signal and the reference frequency signal.

14. The method of claim 9, further comprising:
receiving an output voltage signal;
receiving a reference voltage signal; and
adjusting a voltage of the main field multiphase power signal component of the high frequency modulated multiphase power signal based on a difference between the reference voltage and the output voltage.

15. The method of claim 9, further comprising:
receiving a rotor frequency signal;
receiving a reference frequency signal; and
adjusting a frequency of the main field multiphase power signal component of the high frequency modulated multiphase power signal based on a difference between the rotor frequency signal and the reference frequency signal.

16. An independent speed variable frequency generator system comprising:
a rotor;
a stator;
a high frequency transformer stage including a first set of high frequency transformer multiphase windings positioned on the stator and a second set of high frequency transformer multiphase windings positioned on the rotor;
a main machine stage including a set of main field multiphase windings positioned on the rotor and a set of main armature multiphase windings positioned on the stator, wherein the second set of high frequency transformer multiphase windings is coupled directly to the set of main field multiphase windings;
a motor start driver; and
a switching circuit configured to open and close a connection between the set of main armature multiphase windings and a power distribution bus and to open and close a connection between the set of main armature multiphase windings and the motor start driver.

17. The system of claim 16, further comprising:
a generator control unit configured to generate a high frequency modulated multiphase power signal that includes a main field multiphase power signal component that is usable to drive the set of main field multiphase windings to create an asynchronous rotating magnetic flux that rotates relative to the rotor.

18. The system of claim 17, further comprising:
a pilot generator stage including a magnetic field source positioned on the rotor and a set of pilot multiphase windings positioned on the stator;
an external power source; and
another switching circuit configured to open and close a connection between the pilot generator stage and the generator control unit and to open and close a connection between the external power source and the generator control unit.

19. The system of claim 17, wherein the generator control unit comprises:
a multiphase inverter having a plurality of switching circuits; and
a controller circuit, an input of each of the plurality of switching circuits coupled to the controller circuit.

20. The system of claim 19, wherein, in a motor state, the controller circuit is configured to open each of the plurality of switching circuits to prevent output at the multiphase inverter.

* * * * *